3,197,283
PROCESS FOR THE PRODUCTION OF
SILICON TETRACHLORIDE
William Edward Hamer, Highfield, Marchwiel, Wrexham, Wales, assignor to Monsanto Chemicals Limited, London, England, a British company
No Drawing. Filed Oct. 10, 1960, Ser. No. 61,351
Claims priority, application Great Britain, Nov. 10, 1959, 38,069/59
4 Claims. (Cl. 23—205)

This invention relates to a process for the production of inorganic chlorides, and particularly of silicon tetrachloride.

Silicon tetrachloride can be prepared in various ways, although the processes involved are not simple ones to operate. In general, high reaction temperatures are necessary, and the processes, for instance the direct chlorination of silicon metal, are often difficult to control. In addition, metallic silicon is relatively expensive and a process with lower raw material costs would be desirable.

It has now been found that a useful and easily controllable process can be operated by combining two different reactions that leads to the production of silicon tetrachloride, so that the heat evolved by one reaction initiates the other and supplies the heat necessary to maintain it. The two reactions which are conducted simultaneously in accordance with this invention can be represented by the following equations:

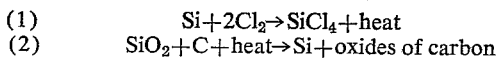

Since the two reactions are conducted in intimate association, the elemental silicon formed in the second reaction furnishes a portion of the silicon consumed in the first reaction set forth above.

The process of the present invention has the important advantage that the relative amount of each of the reactants can be such that the process proceeds at an elevated and substantially constant temperature. In addition to the advantage of being more readily controllable, the process has the further advantage that a portion of the silicon consumed in the production of silicon tetrachloride is derived from silica which is normally a less expensive raw material than elemental silicon.

Although the process can, if desired, be carried out in other ways, it is often preferable to arrange matters so that the solid reactants (the silicon, silica and carbon) act as a fluidized bed when the chlorine is passed through in gas or vapor form. The solid reactants can be present each in a suitable particulate form, or two or more of them can be present as a blend obtained for instance by mixing two of the finely-divided components together and then forming into small granules. For example, there can be employed finely-divided silicon mixed with small granules formed by compression from a blend of finely-divided silica and finely-divided carbon. Preferably, however, for smooth operation of the process the three solid reactants each in finely-divided form are thoroughly mixed together and the mixture is then formed into small granules, regular or irregular, and however formed. In these circumstances the silicon is well placed for the heat evolved on chlorination to initiate the more difficult chlorination of silica plus carbon, whilst at the same time the presence of the other two reactants moderates the violence of the silicon chlorination. However, for these considerations to apply, the three reactants need not necessarily be mixed and made into granules in this way.

When the fluidized bed technique is employed the solid reactants will, of course, have a particle size such that they are maintained in suspension by the gas flow, but it is also preferable that they are not so small that excessive amounts of them are carried away in the stream of exit gases. The solid reactants are often, for example, conveniently of particle size such that they pass through a sieve of 10 meshes per linear inch. Subject to this requirement, good results are obtained when the particles cover a wide range of sizes.

The silicon of the usual commercial grade, containing 96-99% silicon, is suitable for use in the process, but less pure material, for example, ferrosilicons of high silicon content, can be employed if desired. Commercial grades of silica (for example, quartz sand or crystobalite) and of carbon are satisfactory.

The proportions of the reactants are chosen such that the heat required to initiate and maintain the endothermic reaction of chlorine with silica and carbon is supplied by heat generated in the chlorination of silicon. Once these conditions exist the process can be carried out continuously for a given flow of chlorine by addition of make-up quantities of silicon, silica and carbon in the correct proportions. For example, 1 mol of silicon can be employed with between 10 and 20 mols of silica. In order to maintain control over the process more readily it is often preferable to employ an excess of the silica and carbon compared with the silicon, so that there is always sufficient of the silica and carbon to make use of the heat evolved from the silicon/chlorine reaction.

The conditions of the over-all process are vigorous, with a reaction temperature in general in the range of 1000° to 2000° C., for instance about 1500° C. In order to obtain sufficient resistance to the high temperatures, as well as to the attrition effect of the solid reactants when a fluidized bed is employed, it is convenient to use a carbon liner to the reactor; the liner can then be readily replaced when necessary.

What is claimed is:
1. A process for the production of silicon tetrachloride which comprises intimately mixing finely divided silicon, carbon and silica, granulating the resulting mixture, and thereafter passing chlorine into contact with the granules of finely divided silicon, carbon and silica, to thereby result in the exothermic reaction of silicon with chlorine to produce silicon tetrachloride and the endothermic reaction of silica with carbon to produce silicon and oxides of carbon, said granules containing from 10 to 20 mols of silica for each mol of silicon and the ratio of silicon, carbon and silica in said granules being such that the heat required to initiate and maintain the endothermic reaction of chlorine with silica and carbon is supplied by heat generated in the chlorination of silicon and such that the process proceeds at an elevated and substantially constant temperature.

2. A process for the production of silicon tetrachloride which comprises passing chlorine into contact with granules of finely divided silicon, carbon and silica to thereby result in the exothermic reaction of silicon with chlorine to produce silicon tetrachloride and the endothermic reaction of silica with carbon to produce silicon and oxides of carbon, said granules containing from 10 to 20 mols of silica for each mol of silicon and the ratio of silicon, carbon and silica in said granules being such that the heat required to initiate and maintain the endothermic reaction of chlorine with silica and carbon is supplied by heat generated in the chlorination of silicon and such that the process proceeds at an elevated and substantially constant temperature.

3. A method according to claim 2 wherein said preselected temperature is from about 1,000° C. to 2,000° C.

4. A method according to claim 3 wherein said chlorine is passed through a fluidized bed of said granules of silicon, carbon and silica.

References Cited by the Examiner

UNITED STATES PATENTS

| | | | |
|---|---|---|---|
| 2,843,458 | 7/58 | Beattie et al. | 23—205 |
| 2,942,950 | 6/60 | Pallister | 23—205 |
| 2,952,513 | 9/60 | Wigton | 23—205 X |
| 3,010,793 | 11/61 | Secord | 23—205 |

FOREIGN PATENTS

| | | |
|---|---|---|
| 577,165 | 6/59 | Canada. |
| 1,079,015 | 4/60 | Germany. |

MAURICE A. BRINDISI, *Primary Examiner.*